(12) United States Patent
Brett et al.

(10) Patent No.: US 7,182,170 B1
(45) Date of Patent: Feb. 27, 2007

(54) GEROTOR AND BEARING SYSTEM FOR WHIRLING MASS ORBITAL VIBRATOR

(75) Inventors: James Ford Brett, Tulsa, OK (US); Robert Victor Westermark, Tulsa, OK (US); Joey Earl Turner, Jr., Claremore, OK (US); Samuel Scott Lovin, Beggs, OK (US); Jack Howard Cole, Fayetteville, AR (US); Will Myers, Rogers, AR (US)

(73) Assignee: Seismic Recovery, LLC, Tulsa, OK (US)

( * ) Notice: Subject to any disclaimer, the term of this patent is extended or adjusted under 35 U.S.C. 154(b) by 414 days.

(21) Appl. No.: 10/697,398

(22) Filed: Oct. 30, 2003

(51) Int. Cl.
*G01V 1/02* (2006.01)
*G01V 1/053* (2006.01)
*G01V 1/153* (2006.01)
*G01V 1/155* (2006.01)
*E21B 28/00* (2006.01)

(52) U.S. Cl. .................... 181/121; 181/113; 181/108; 181/112; 181/106; 166/249; 166/104; 166/177.6

(58) Field of Classification Search ............. 181/121, 181/113, 108, 112, 106
See application file for complete search history.

(56) References Cited

U.S. PATENT DOCUMENTS

| | | | | | |
|---|---|---|---|---|---|
| 2,679,384 | A | * | 5/1954 | Livingston et al. | ............. 74/87 |
| 3,532,447 | A | * | 10/1970 | Charlson | .................... 418/61.3 |
| 4,021,161 | A | * | 5/1977 | McDermott | ................. 418/61.3 |
| 4,923,376 | A | * | 5/1990 | Wright | ......................... 418/48 |
| 5,159,160 | A | | 10/1992 | Brett | ........................... 181/106 |
| 5,210,381 | A | | 5/1993 | Brett | ........................... 181/106 |
| 5,309,405 | A | | 5/1994 | Brett et al. | ..................... 367/36 |
| 5,398,294 | A | * | 3/1995 | Narkon | ......................... 384/280 |
| 5,515,918 | A | | 5/1996 | Brett et al. | .................. 166/249 |
| 5,996,739 | A | * | 12/1999 | Hoffmann | .................... 184/7.4 |
| 6,059,031 | A | * | 5/2000 | Brett | ........................... 166/249 |
| 6,155,792 | A | * | 12/2000 | Hartley et al. | ................. 417/53 |
| 6,244,839 | B1 | * | 6/2001 | Cole et al. | ..................... 418/21 |
| 6,557,639 | B1 | * | 5/2003 | Matthews et al. | ........... 166/369 |

* cited by examiner

*Primary Examiner*—Lincoln Donovan
*Assistant Examiner*—Jeremy Luks
(74) *Attorney, Agent, or Firm*—Head, Johnson & Kachigian

(57) ABSTRACT

A gerotor and bearing apparatus for a whirling mass orbital vibrator which generates vibration in a borehole. The apparatus includes a gerotor with an inner gear rotated by a shaft having one less lobe than an outer gear. A whirling mass is attached to the shaft. At least one bearing is attached to the shaft so that the bearing engages at least one sleeve. A mechanism is provided to rotate the inner gear, the mass and the bearing in a selected rotational direction in order to cause the mass, the inner gear, and the bearing to backwards whirl in an opposite rotational direction. The backwards whirling mass creates seismic vibrations.

15 Claims, 3 Drawing Sheets

FIG. 1
FIG. 2
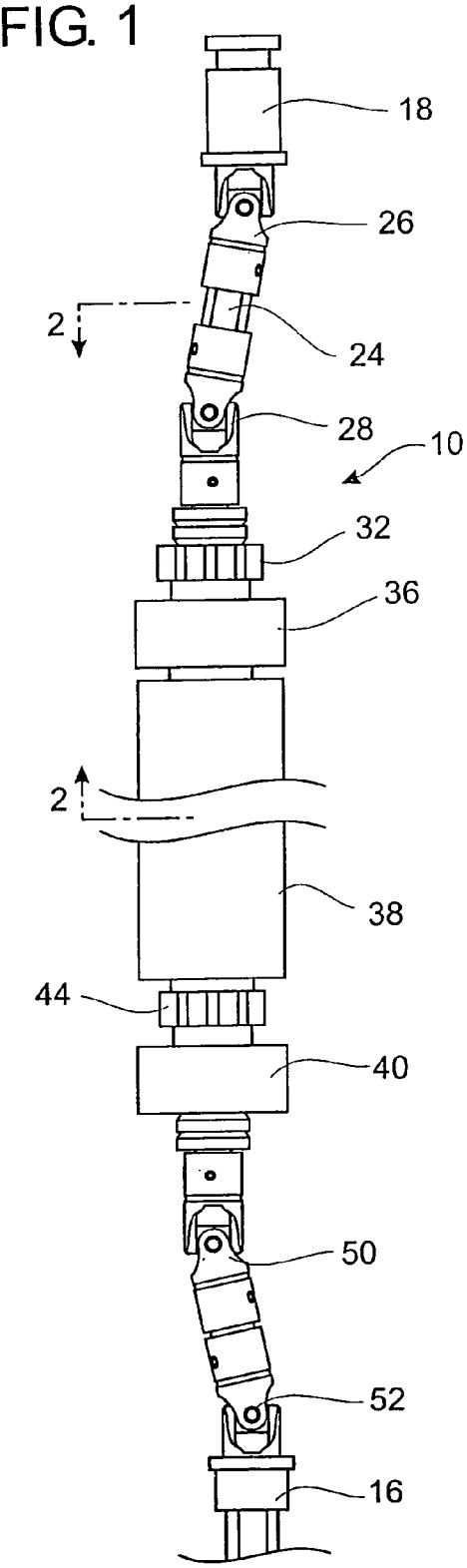
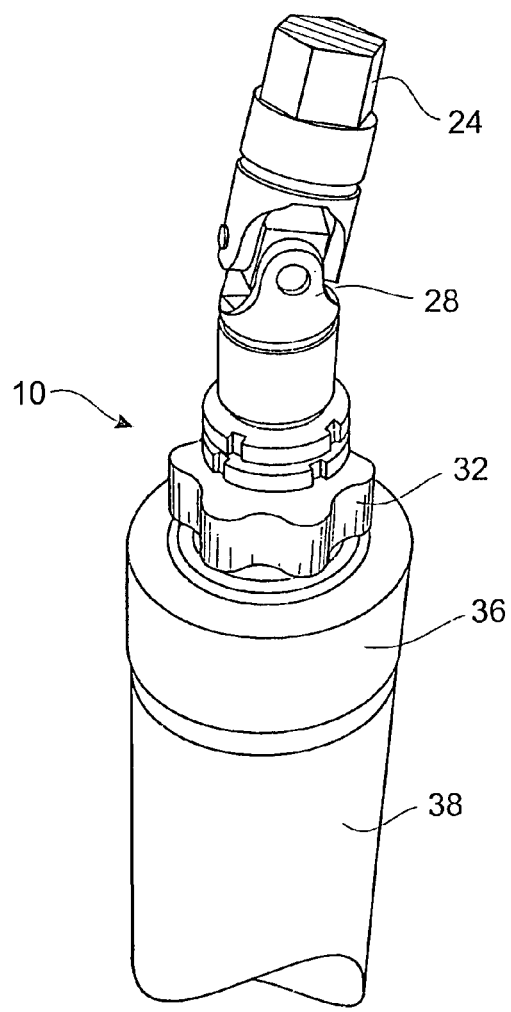

FIG. 3
FIG. 4
FIG. 5
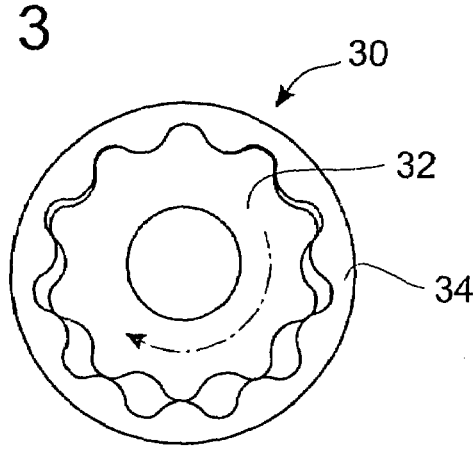
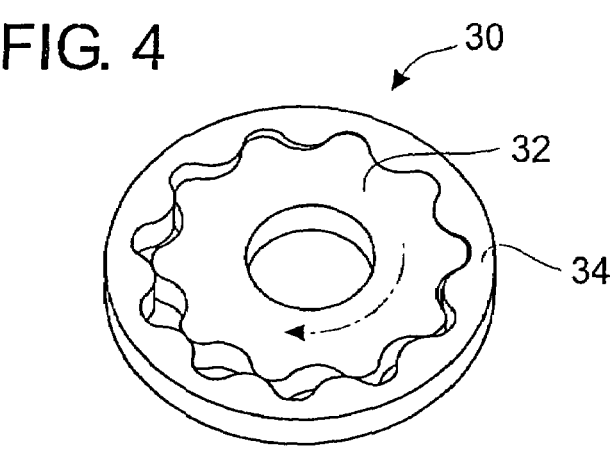
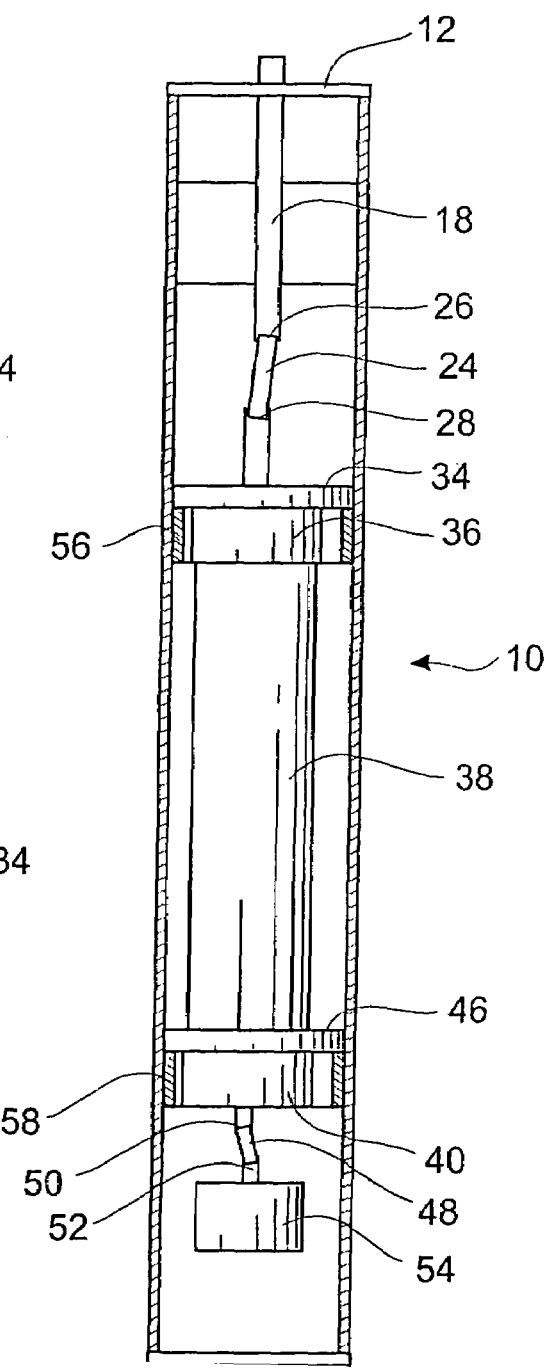

GEROTOR AND BEARING SYSTEM FOR WHIRLING MASS ORBITAL VIBRATOR

STATEMENT REGARDING FEDERALLY SPONSORED RESEARCH OR DEVELOPMENT

This invention was made with U.S. Government support under Prime Contract No. DE-FG26-00BC15191 awarded by the United States Department of Energy. The U.S. Government has certain rights in the invention.

BACKGROUND OF THE INVENTION

1. Field of the Invention

The present invention relates to a gerotor and bearing system for a backwards whirling mass orbital vibrator. In particular, the present invention is directed to a gerotor and bearing apparatus and method to use a whirling mass orbital vibrator to generate vibrations.

2. Prior Art

Subterranean seismic vibration signals are known to be used in order to allow investigation of the geology surrounding subterranean boreholes. For example, the energy industry is known to utilize downhole vibration signals as a seismic energy source for generating information to evaluate the potential for deposits of oil and gas accumulation and other information. Seismic profiles of the earth may be generated from this information.

Seismic signals can be generated by various devices that may employ vibration which generates a sound wave directly or indirectly through the earth.

The use of downhole mechanical vibrations to increase the mobility of petroleum and gas deposits is also known. Vibrations are believed to decrease fluid interfacial tension as well as capillary forces, thereby allowing hydrocarbons to flow more easily.

Mechanical mechanisms to generate vibrations by spinning a shaft to create rotational energy are also known. For example, see Assignee's patents such as U.S. Pat. No. 5,159,160, U.S. Pat. No. 5,305,405, U.S. Pat. No. 5,210,381 and U.S. Pat. No. 5,515,918. The mechanical means may be provided by rotating a shaft in a selected rotational direction which causes a mass to backwards whirl in a direction opposite to rotational direction. Backwards whirl is defined as the motion of a circle having a diameter (d) whirling within another circle having a diameter (D), which generates a hypocycloid with multiple vibrations per rotation as follows:

$$\frac{d}{D-d}$$

In the past, various types of mechanisms were used to insure a controlled backwards whirling motion. In one example, small, involute gears were utilized. It was important to assure that the mass did not encourage the gears to become misaligned, jump the gear teeth and then grind or destroy the gears over time due to misalignment.

Gerotors are one type of known gearing system. A typical gerotor includes an inner gear and an outer gear section. The gerotor is a system wherein the outer gear set has one more gear tooth or lobe than the inner gear set. In the past, gerotors have been used as fluid pumps and/or as hydraulic motors. In fluid pump applications, a fluid porting mechanism is utilized such that when the inner gear section is rotated in relation to the outer gear section, the fluid is pressurized. As the inner gear set rotates, a volume is created. This motion creates a volume of reduced pressure and fluid is drawn in. In a hydraulic motor application, a porting mechanism is used to force hydraulic fluid between the inner and outer gear sections imparting a rotary motion to the inner gear section.

For example, U.S. Pat. No. 6,336,317 to Holtzapple et al discloses use of a gerotor in an engine.

There remains a need to provide a gerotor and bearing system for a whirling mass orbital vibrator that will transmit vibrational energy.

There remains a need to provide a gerotor and bearing system for a whirling mass orbital vibrator that is efficient and will operate effectively downhole with minimal maintenance.

There also remains a need to provide a continuous drip lubrication system for a whirling mass orbital vibrator having a self contained lubricating system.

SUMMARY OF THE INVENTION

The present invention provides a gerotor and bearing apparatus for a whirling mass orbital vibrator. The apparatus is contained in a housing which encloses an upper end of the device through which an upper drive shaft extends. Suspended from the upper drive shaft is a drive shaft connected by a pair of opposed U-joints on each end. The arrangement of the U-joints allows off center or eccentric axial movement. Attached to the drive shaft and U-joints is an upper gerotor set having an inner gear with one less lobe than an outer gear. Attached below the inner gear of the upper gerotor is an upper track roller bearing which engages a cylindrical sleeve mounted on the housing. Attached below the upper track roller bearing is a cylindrical mass. The upper track roller bearing is parallel and axially aligned to the mass.

A lower gerotor set having an inner gear and an outer gear are similar in configuration to the upper gerotor set. The inner gear is attached to the cylindrical mass. The upper gerotor set and lower gerotor set are radially aligned and parallel.

Attached below the lower gerotor set is a lower track roller bearing. The lower track roller bearing is parallel and is axially aligned with the cylindrical mass and with the upper track roller bearing. Attached below the lower track roller bearing is a pump shaft having a pair of U-joints on each end. A pump suspended from the pump shaft and rotated by the drive shaft serves to provide oil and lubrication for the apparatus.

BRIEF DESCRIPTION OF THE DRAWINGS

FIG. 1 illustrates a front elevational view of a portion of a gerotor and bearing apparatus for a whirling mass orbital vibrator constructed in accordance with the present invention;

FIG. 2 is a perspective view of a portion of the apparatus taken along section lines 2—2 of FIG. 1;

FIG. 3 illustrates a top view, and FIG. 4 illustrates a perspective view of a gerotor set which is a part of the gerotor and bearing apparatus of the present invention;

FIG. 5 is a simplified diagrammatic view of the gerotor and bearing apparatus within a housing.

DETAILED DESCRIPTION OF THE PREFERRED EMBODIMENTS

Figure 6:
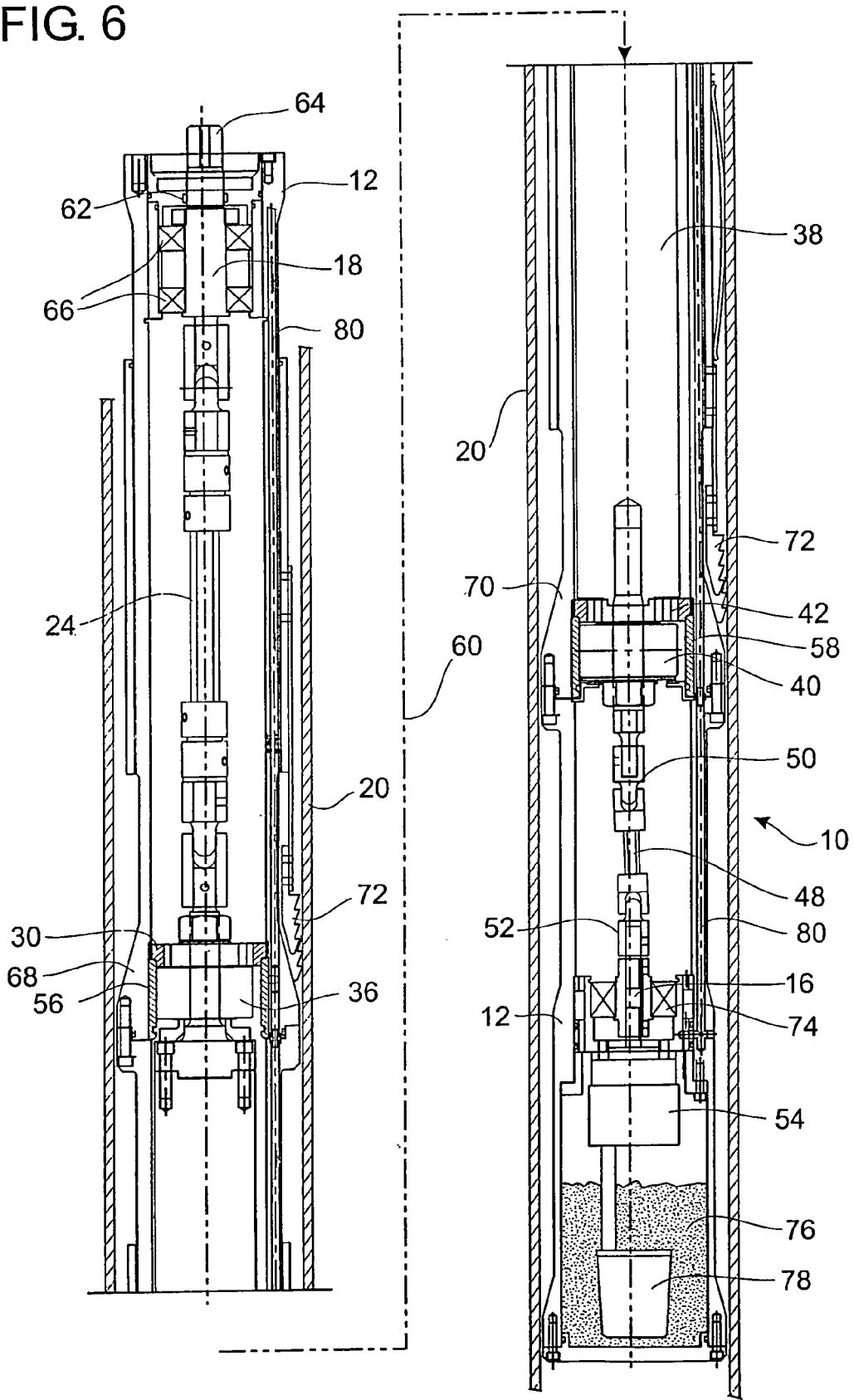
FIG. 6 is an elevational, sectional view of the gerotor and bearing apparatus within a housing set inside casing.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, FIG. 1 illustrates a front view of a portion of a gerotor and bearing apparatus 10 for a downhole whirling mass orbital vibrator constructed in accordance with the present invention. In FIG. 1, an external housing 12 of the apparatus has been removed for clarity.

The present invention will be utilized downhole in a cased borehole which extends from the earth's surface and has been drilled in a usual, known manner in drilling for oil, gas or other wells. The present invention will generate vibrations downhole which may be used in a number of applications. One application of the present invention is to generate a seismic energy signal which can be used to generate compression and shear wave signals that travel in the earth and can be detected. Another application of the present invention is for enhanced oil recovery. Seismic stimulation of oil-bearing strata is known to increase fluid recovery.

In one embodiment, extending from an upper drive shaft 18 is a shaft 24 surrounded by a pair of U-joints 26 and 28. A housing 12 (shown in FIG. 5) encloses an upper end of the device 10. Rotation of the drive shaft 18 will translate into rotation of the shaft 24. The shaft may be rotated by mechanical, electrical, or hydraulic systems as are well known. The arrangement of the U-joints 26 and 28 with the shaft 24 allows the shaft to make off center or eccentric movement. Accordingly, while the shaft 18 produces centered rotation, the gerotor is permitted to rotate out of axial alignment.

Attached to the shaft 24 and U-joints 26 and 28 is a gerotor set 30 having an inner gear 32 (visible in FIG. 1). An outer gear 34 (not seen in FIG. 1) surrounds the inner gear and is attached to the housing. As will be seen, the gerotor inner gear 32 has one less lobe than the outer gear. Attached below the upper gerotor 30 is an upper track roller bearing 36. As will be seen, the upper track roller bearing 36 contacts a cylindrical sleeve.

Attached below the upper track roller bearing 36 is a parallel and axially aligned cylindrical mass 38. Attached below the cylindrical mass 38 is an inner gear 44 (visible in FIG. 1) of a lower gerotor set. An outer gear 44 (not seen in FIG. 1) surrounds the inner gear and is attached to the housing. Attached below the lower gerotor is a lower track roller bearing 40. The lower track roller bearing 40 is parallel and is axially aligned with the cylindrical mass 38 and the upper track roller bearing 36.

Attached below the lower track roller bearing is a second shaft having a pair of U-joints 50 and 52 on opposing ends of the shaft 48. A lower drive shaft 16 of the apparatus is suspended below the second shaft 48.

It will be observed from the foregoing that the inner gears and the track roller bearings and mass are axially aligned. The track roller bearings can rotate independently relative to the inner gears and mass.

FIG. 2 shows a perspective view taken along sectional line 2—2 of FIG. 1 showing a portion of the gerotor and bearing apparatus 10 in an enlarged view. Referring to FIG. 1 and with continuing reference to FIG. 2, the U-joint 28 permits the inner gear of the upper gerotor set, upper roller bearing 36 and cylindrical mass 38 to be eccentric to the drive shaft 18.

FIG. 3 shows a top view and FIG. 4 shows a perspective view of one of the gerotor sets, for example, the upper gerotor set 30. The inner gear 32 resides and operates within the outer gear 34. As can be seen, the inner gear 32 has one less lobe than the outer gear 34. For example, inner gear 32 has ten lobes while outer gear 34 has eleven lobes. The lower gerotor set 42 (not shown) would be similar in arrangement.

FIG. 5 illustrates a simplified, diagrammatic view of the gerotor and bearing apparatus 10 of the present invention. The apparatus 10 is contained in a fluid tight housing and operates and resides downhole within casing 20 in a borehole (shown in FIG. 6).

The cylindrical mass 38 has an exterior diameter less than the interior diameter of the housing 12 of the apparatus. Extending from the second shaft 48 and U-joints 50 and 52 is a pump 54 (a diagrammatic view seen in FIG. 5). The pump 54 serves to provide oil and, in turn, lubrication for the gerotor and bearing apparatus 10 of the present invention.

The upper track roller bearing 36 rolls on and operates within an upper cylindrical sleeve 56 while the lower track roller bearing 40 rolls on and operates within a lower sleeve 58.

FIG. 6 shows a detailed sectional view of one embodiment of the gerotor and bearing apparatus 10. The illustration of the apparatus 10 has been split in two as shown by dashed line 60.

A housing 12 of the apparatus 10 surrounds the components shown in FIGS. 1 and 2 and forms a fluid tight enclosure. A seal 62 creates a fluid tight seal with the shaft. A series of bearings 66 surround the shaft.

As the mass is rotated, the roller bearings 36 and 40 contact the sleeves 56 and 58. The housing 12 includes a pair of cones 68 and 70 which have larger diameters than the housing 12. A plurality of slips 72 are lowered and follow the cones and engage the casing 20.

Returning to consideration of FIGS. 3 and 4, when the cylindrical mass 38 is rotated in a clockwise direction, for example, the rotation of the inner gears of the upper gerotor and lower gerotor forces the cylindrical rotating mass 38 within the housing to move in a counterclockwise, backwards whirling motion.

The mass will backwards whirl at a speed defined by a backward whirl multiplier factor according to the following formula:

$$K = \frac{n}{N - n}$$

where n = number of lobes on inner rotor and N = number of lobes on outer rotor

In order to prevent the gerotors 30 and 42 from having to support the high force loads generated by the backwards whirling mass, the heavy-duty track roller bearings 36 and 40 are utilized to transmit the centrifugal force created by the whirling mass to the sleeves 56 and 58 and then the housing of the apparatus 10. The vibrations generated by the centrifugal force created by the backwards whirling mass are transmitted to the cones 68 and 70 of the housing and then through the slips 72 to the casing 20. It will be observed that the slips 72 are directly in line with the sleeves 56 and 58 so that a direct load path exists from the applied load of the rotating mass through the casing to the well formation. The track rolling bearings 36 and 40 and the upper gerotor and lower gerotor are specially sized in order to allow the gerotors to force or pull the mass into a backwards whirling motion and have the bearings support the centrifugal force generated by the whirling mass.

The lower drive shaft 16 is surrounded by bearings 74 to retain the lower shaft in axial alignment. Below the lower drive shaft 16 and connected thereto is a fluid pump. Lubricating oil is contained in an oil sump 76. A filter 78 prevents solids from entering the pump 54. The pump 54 delivers oil through a passageway 80 in the housing 12. The passageway 80 may have certain openings or perforations to allow oil to drip into the interior of the housing so that the gerotors, bearings and the other components of the apparatus are lubricated at all times. A self-contained drip lubrication system is thereby provided.

Whereas, the present invention has been described in relation to the drawings attached hereto, it should be understood that other and further modifications, apart from those shown or suggested herein, may be made within the spirit and scope of this invention.

What is claimed is:

1. A gerotor and bearing apparatus for a downhole whirling mass orbital vibrator generating vibration in a borehole, which apparatus comprises:
   a pair of gerotors being axially spaced and coaxially aligned:
   each of said gerotors having an inner gear rotated by a shaft having one less lobe than an outer gear;
   a whirling mass attached to said shaft;
   an upper track roller bearing attached to said shaft engaging and rolling on an upper sleeve;
   a lower track roller bearing attached to said shaft engaging and rolling on a lower sleeve wherein said bearings are on opposite ends of said whirling mass; and
   means to rotate said inner gears, said mass, and said bearings eccentric from an axis of said shaft in a selected rotational direction to cause said mass, said inner gears and said bearings to backwards whirl in an opposite rotational direction.

2. A gerotor and bearing apparatus as set forth in claim 1 wherein said bearings and said sleeves are replaceable.

3. A gerotor and bearing apparatus as set forth in claim 1 wherein said means to rotate said inner gear, said mass, and said bearing in a selected rotational direction includes a drive shaft with a plurality of U-joints.

4. A gerotor and bearing apparatus as set forth in claim 1 including a fluid pump powered by said shaft providing a self-contained drip lubrication system having a fluid pump moving lubricating oil from an oil sump.

5. A gerotor and bearing apparatus as set forth in claim 4 including a pair of U-joint assemblies.

6. A gerotor and bearing apparatus as set forth in claim 1 wherein said backwards whirling mass is an elongated cylinder.

7. A gerotor and bearing apparatus as set forth in claim 1 wherein said backwards whirling mass produces vibration energy which is used in enhanced fluid recovery.

8. A gerotor and bearing apparatus as set forth in claim 1 wherein said backwards whirling mass produces vibration energy which is used as a seismic source.

9. A gerotor and bearing apparatus as set forth in claim 1 wherein said backwards whirling mass is an elongated cylindrical configuration with a diameter less than said housing.

10. A gerotor and bearing apparatus as set forth in claim 1 wherein said inner gear backwards whirl at a speed defined by a factor $$K = \frac{n}{N-n}$$

where n = number of lobes on inner rotor and N = number of lobes on outer rotor

11. A method to generate vibrational energy in a borehole, which method comprises:
   rotating a pair of axially spaced and coaxially aligned gerotors by rotation of an inner gear in each of said gerotors by a shaft in a selected rotational direction wherein each said inner gear has one less lobe than an outer gear;
   rotating a whirling mass in a selected rotational direction by rotation of said shaft so that said mass and said inner gear backwards whirl in a direction opposite to said selected rotational direction; and
   transmitting centrifugal force created by said whirling mass from an upper bearing to an upper cylindrical sleeve and from a lower bearing to a lower cylindrical sleeve by contacting and rolling on said sleeves eccentric from an axis of said shaft wherein said bearings are attached to said shaft on opposite ends of said whirling mass.

12. A method to generate vibrational energy in a borehole as set forth in claim 11 including transmitting said centrifugal force to a downhole casing.

13. A method to generate vibrational energy in a borehole as set forth in claim 11 wherein said centrifugal force generates vibrational energy.

14. A method to generate vibrational energy in a borehole as set forth in claim 11 including transmitting said centrifugal force from said sleeves to slips and to a casing.

15. A gerotor and bearing apparatus for a downhole whirling mass orbital vibrator generating vibration in a borehole, which apparatus comprises:
   a pair of gerotors axially spaced from each other and coaxially aligned;
   each of said gerotors having an inner gear rotated by a shaft having one less lobe than an outer gear;
   a whirling mass attached to said shaft;
   a pair of track roller bearings attached to said shaft on opposite ends of said whirling mass;
   means to rotate said inner gears, said mass, and said bearings eccentric from an axis of said shaft in a selected rotational direction to cause said gears, said mass, and said bearings to backwards whirl in an opposite rotational direction so that said track roller bearings roll on cylindrical sleeves; and
   means to maintain angular radial position and angular alignment between said ends of said rotating mass.

\* \* \* \* \*